(12) United States Patent
Rittweger et al.

(10) Patent No.: US 12,023,965 B2
(45) Date of Patent: Jul. 2, 2024

(54) PNEUMATIC VEHICLE TIRES HAVING A MARKING SURFACE

(71) Applicant: Continental Reifen Deutschland GmbH, Hannover (DE)

(72) Inventors: Stefan Rittweger, Garbsen (DE); Juraj Jurco, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 234 days.

(21) Appl. No.: 17/595,685

(22) PCT Filed: Apr. 8, 2020

(86) PCT No.: PCT/EP2020/059957
§ 371 (c)(1),
(2) Date: Nov. 22, 2021

(87) PCT Pub. No.: WO2020/239306
PCT Pub. Date: Dec. 3, 2020

(65) Prior Publication Data
US 2022/0219495 A1   Jul. 14, 2022

(30) Foreign Application Priority Data
May 29, 2019  (DE) ............ 10 2019 207 939.3

(51) Int. Cl.
*B60C 13/02*  (2006.01)
*B60C 13/00*  (2006.01)

(52) U.S. Cl.
CPC ............ *B60C 13/001* (2013.01); *B60C 13/02* (2013.01)

(58) Field of Classification Search
CPC ..... B60C 13/00; B60C 13/001; B60C 13/002; B60C 13/02; B60C 13/023; B60C 15/024
See application file for complete search history.

(56) References Cited

U.S. PATENT DOCUMENTS

| 5,263,525 A | 11/1993 | Yamashita |
| 8,776,852 B2 | 7/2014 | Tokizaki |
| (Continued) | | |

FOREIGN PATENT DOCUMENTS

| DE | 69202013 T2 | 8/1995 |
| DE | 102013205445 A1 | 10/2013 |
| (Continued) | | |

OTHER PUBLICATIONS

International Search Report dated Jul. 6, 2020 of International Application PCT/EP2020/059957 on which this application is based.

*Primary Examiner* — Justin R Fischer

(57) ABSTRACT

A pneumatic vehicle tire (1) having sidewalls (2) and a tread (3) and having at least one marking surface (4) on at least one of the sidewalls (2) and/or on the tread (3), wherein the marking surface (4) has two parallel sets (5, 5') of elongate elevations (6, 6'), wherein the two parallel sets (5, 5') intersect and form a parallelogram grid.
The problem addressed is therefore that of influencing the contrast effect in even more targeted fashion, and further increasing the contrast effect. It is also the intention to realize easy producibility of the tire.
This is achieved in that the parallelograms of the parallelogram grid have an interior angle (7) of 35° to 90°, and in that at least one parallelogram, preferably at least half of the parallelograms, particularly preferably all of the parallelograms, has or have an additional elevation (8) within its or their areal extent.

13 Claims, 4 Drawing Sheets

(56) References Cited

U.S. PATENT DOCUMENTS

| | | |
|---|---|---|
| 10,442,251 B2 | 10/2019 | Murata |
| 2012/0055603 A1 | 3/2012 | Tokizaki |
| 2014/0027035 A1 | 1/2014 | Joza |
| 2015/0321523 A1* | 11/2015 | Takahashi ............... B60C 13/02 |
| | | 152/523 |

FOREIGN PATENT DOCUMENTS

| | | | |
|---|---|---|---|
| DE | 112014002818 T5 | | 3/2016 |
| WO | WO 2018/008716 | * | 1/2018 |

* cited by examiner

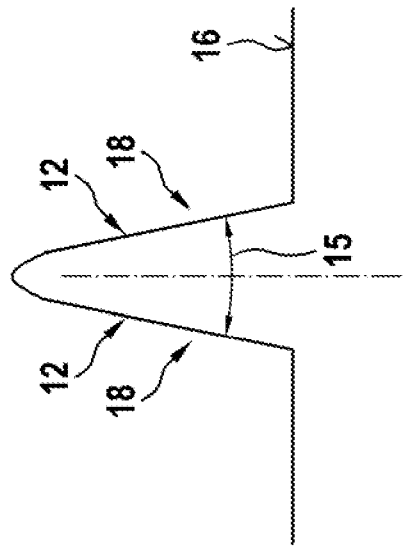
Fig. 4a
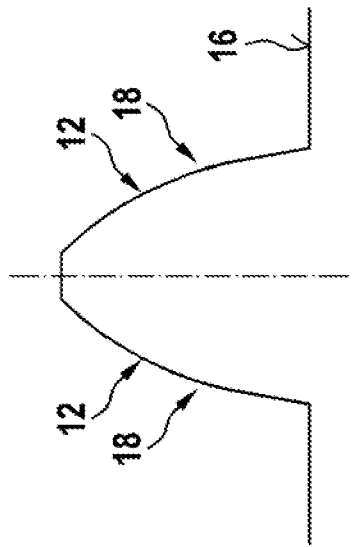
Fig. 4b
Fig. 4c
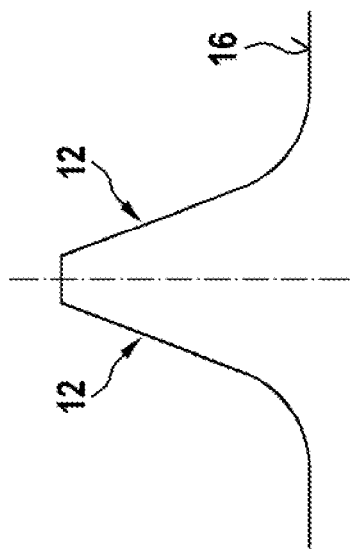
Fig. 4d

PNEUMATIC VEHICLE TIRES HAVING A MARKING SURFACE

The invention relates to a pneumatic vehicle tire having sidewalls and a tread and having at least one marking surface on at least one of the sidewalls and/or the tread, wherein the marking surface has two parallel sets of elongate elevations, wherein the two parallel sets intersect and form a parallelogram grid.

Such marking surfaces are generally molded into the tire in the course of the vulcanization of the tire by means of a shape-imparting vulcanization mold which has a negative contour of the marking surface. A structured surface of an already vulcanized tire can however also be achieved by removal, for example by means of engraving, or by an additive process.

Such marking surfaces are known. On the tire sidewall and/or on the tread, they are used for example to realize a marking. A marking may include images, characters, company names, company logos, designations, areas, etc. The marking surface may be part of the marking and/or may completely or partially surround the latter.

The scattering of light on the flanks of the elevations reduces the reflection of the light on the surface of the tire, which changes the brightness effect. In general, surface regions provided with transverse elevations appear darker than substantially smooth surface regions that are free from such elevations. This make it possible to realize a contrast in the inherently monochrome surface of the tire, in particular of the sidewall and/or of the tread. Depictions of markings can thus be made more clearly visible.

For example, DE 69 202 013 T3 has disclosed a pneumatic vehicle tire which, on its sidewall, has a diamond grid having an interior angle of 90° for a high-contrast surface design and accentuation of a marking.

A disadvantage of such embodiments is that the design options are limited.

The problem addressed is therefore that of influencing the contrast effect in even more targeted fashion, and further increasing the contrast effect. It is also the intention to realize easy producibility of the tire.

This is achieved in that the parallelograms of the parallelogram grid have an interior angle of 35° to 90°, and in that at least one parallelogram, preferably at least half of the parallelograms, particularly preferably all of the parallelograms, has or have an additional elevation within its or their areal extent.

It has been found that such a parallelogram grid produces a significantly greater contrast effect than a grid which is free from at least one additional elevation of this kind.

By means of the additional elevation within the areal extent, i.e. between the ridges of the elongate elevations forming the parallelogram, of a parallelogram, the density of surfaces inclined relative to the tire surface is increased. This increases the variation of surfaces and of the alignment thereof at which light can be reflected, scattered and absorbed in different directions. The additional inclined surfaces of the additional elevation increase the scattering, the multiple reflection and the absorption of light that is incident on the marking surface. In addition, the additional elevations create additional shadow effects which, particularly on the black rubber of the sidewalls, give rise to a clear accentuation of the marking surface in relation to the surrounding surface regions. Thus, the contrast effect can be influenced and improved even more selectively.

If half of all the parallelograms have such an additional elevation, it is possible, as with a chessboard pattern, for every second parallelogram to have the additional elevation. Particularly uniform distribution of the parallelograms with an additional elevation is thereby achieved. However, the parallelograms with additional elevations may also be arranged in alternate rows.

A further enhancement of these advantages is achieved by the fact that more than half, preferably all, of the parallelograms have such an additional elevation.

Limiting the interior angle to at least 35° furthermore ensures an advantageous capacity for venting and demolding the marking surface in the process of building the tire by means of a vulcanization mold.

One advantageous embodiment is provided by the fact that the interior angle is 35° to 55°, preferably 40° to 50°, particularly preferably 45°.

The interior angle of 35° to 55°, preferably of 40° to 50°, particularly preferably of 45°, brings about a higher density and variety of inclined surfaces for each area than a square grid of the same edge length. In addition, the regions around the acute interior angle create additional shadow effects which, particularly on the black rubber of the sidewalls, give rise to a clear accentuation of the marking surface in relation to the surrounding surface regions. Thus, the contrast effect can be influenced and improved even more selectively.

One advantageous embodiment is provided by the fact that the additional elevation of the parallelogram has an elongate extent with two end regions and that the additional elevation is attached to one of the elongate elevations of the parallelogram in precisely one end region of the two end regions, in particular at a height H3, which corresponds to at least ⅓ of the height H of the parallelogram grid.

The additional elevation thus has an elongate extent and is attached, i.e. connected, by one of its end regions to one of the elongate elevations of the parallelogram, in particular at a height H3 which is at least ⅓ of the height H of the parallelogram grid.

The height H of the parallelogram grid can be the height averaged over all the elongate elevations along their longitudinal extent. Heights can be measured relative to a level that corresponds to a mean level of the marking base of the marking region. The level may also be the mean level of the lowest points of the parallelograms. Heights may also be measured with respect to a level that corresponds to a base level that is formed, for example, by a part of the outer surface of the pneumatic vehicle tire, in particular a base of a shallow depression formed on the surface of the tire.

Mean values generally correspond to the arithmetic mean value.

By means of attachment, an improved capacity for venting during the building of the tire is achieved. Furthermore, the additional elevation stabilizes the elongate elevation to which it is attached, thereby ensuring that the elongate elevation is more resistant to chafing during the use of the tire.

Thus, the additional elevation ends with the free, unattached end region within the areal extent of the parallelogram. The inclined surfaces of the free end region of the additional elevation cause additional scattering of the light in different directions.

One advantageous embodiment is provided by the fact that the elongate extent of the additional elevation is aligned largely parallel to one of the two parallel sets.

This keeps down the number of directions in which elevations or depressions have to be created to generate the corresponding structure during the production of the pneumatic vehicle tire.

One advantageous embodiment is provided by the fact that the additional elevation has a free end region which, at a height H2 which corresponds to ⅓ of the height H of the parallelogram grid, has a clear spacing of 0.05 mm to 0.2 mm, preferably of 0.08 mm to 0.15 mm, with respect to the elongate elevation situated opposite the free end region.

Thus, the additional elevation ends with the free, unattached end region within the areal extent of the parallelogram. The inclined surfaces of the free end region of the additional elevation cause additional scattering of the light in different directions. The clear spacing of the free end region of 0.05 mm to 0.2 mm, preferably of 0.08 mm to 0.15 mm, with respect to at least one of the elongate elevations has proven particularly advantageous for an enhanced contrast effect with, at the same time, good demoldability.

One advantageous embodiment is provided by the fact that the parallelogram grid has a height H of 0.1 mm to 0.8 mm, preferably of 0.2 mm to 0.5 mm, particularly preferably of 0.25 mm to 0.35 mm.

By means of such a height H, advantageous dimensioning to the benefit of suitability for production is achieved. Furthermore, a good contrast effect can be achieved with such a depth, in particular in conjunction with a spacing of the parallel set of 0.4 mm to 1.0 mm, preferably of 0.5 mm to 0.7 mm, particularly preferably of 0.55 mm to 0.60 mm.

One advantageous embodiment is provided by the fact that the additional elevation has a lower height H' than the height H of the parallelogram grid.

In this way, whilst achieving an advantageous support action of the short transverse elevations, the demoldability is simultaneously further improved.

One advantageous embodiment is provided by the fact that the elongate elevations of at least one, preferably both, of the two parallel sets are arranged at a spacing of 0.4 mm to 1.0 mm, preferably of 0.5 mm to 0.7 mm, particularly preferably of 0.55 mm to 0.6 mm.

Such a spacing of 0.4 mm to 1.0 mm, preferably of 0.5 mm to 0.7 mm, particularly preferably of 0.55 mm to 0.60 mm, makes an improved contrast effect possible with simultaneously low manufacturing outlay. The spacing can be measured between areas that run perpendicular to the tire surface and along the ridges of the elongate elevations of the parallel sets.

One advantageous embodiment is provided by the fact that the parallelogram grid is a diamond grid.

Thus, the two parallel sets have the same spacings. A particularly uniform structure is thereby brought about. It has proven particularly advantageous here if the two parallel sets have an identical spacing of 0.4 mm to 1.0 mm, preferably of 0.5 mm to 0.7 mm, particularly preferably of 0.55 mm to 0.60 mm.

One advantageous embodiment is provided by the fact that at least one of the elongate elevations has mutually opposite flanks which enclose an angle of at least 50°, preferably of 55° to 65°, with one another.

Such flank angles exhibit a good contrast effect. A corresponding negative shape of a molding tool such as a vulcanization mold can be created by means of laser engraving. It is particularly advantageous here if the mutually opposite flanks have such an angle over a vertical extent which corresponds to at least one quarter of the height H of the parallelogram grid. This is advantageous both at an angle of at least 50° and at an angle of 55° to 65°.

The advantage is also or additionally intensified if several, preferably all, elongate elevations of at least one parallel set are formed in this way. It is also advantageous if the elongate elevations of both parallel sets have flanks formed in this way. The angle can be measured between two crossing regions or between a crossing region and an attached end region.

One advantageous embodiment is provided by the fact that at least one of the elongate elevations and/or the additional elevation of a parallelogram has mutually opposite flanks which enclose an angle of 2° to 10°, preferably of 6° to 8°, with one another.

Multiple reflection and thus an improved contrast effect can be achieved with such a steep flank angle. A corresponding negative shape of a molding tool such as a vulcanization mold can be created by means of laser engraving of the molding tool.

It is particularly advantageous here if the mutually opposite flanks have such an angle over a vertical extent which corresponds to at least one quarter of the height H of the parallelogram grid. This is advantageous both at an angle of 2° to 10° and at an angle of 6° to 8°.

In the case of elongate elevations, the angle can be measured between two crossing regions or between a crossing region and an attached end region. In the case of an additional elevation, the angle can be measured between an attached end region and an unattached end region.

It is preferable if at least the additional elevation of the parallelogram has mutually opposite flanks which enclose an angle of 2° to 10°, preferably of 6° to 8°, with one another. An additional elevation of such narrow design can be excellent fitted into the areal extent of the parallelogram.

It may be expedient if the additional elevation has mutually opposite flanks which enclose an angle of 2° to 10°, preferably of 6° to 8°, with one another and, at the same time, has a mean width of 0.08 mm to 0.13 mm, preferably of 0.1 mm. The mean width is the arithmetic mean value of the width measured at different heights.

One advantageous embodiment is provided by the fact that at least one of the elongate elevations and/or at least one additional elevation has a cross section which, in the region of at least one flank, has a convexly curved and/or a linear and/or a concavely curved and/or a stepped and/or a bent and/or a structured region.

The cross section runs perpendicular to the direction of longitudinal extent of the respective elongate elevation or additional elevation. The cross section of an elongate elevation can be measured between two crossing regions or between a crossing region and an attached end region. The cross section of an additional elevation can be measured between an attached end region and a free end region. By means of such a cross section, the contrast effect can be influenced and further enhanced even more selectively.

It is particularly advantageous here if the correspondingly shaped region extends over a vertical extent which corresponds to at least one quarter of the height H of the parallelogram grid.

The cross section may be symmetrical.

The elongate elevation and/or the additional elevation can merge into a marking base at a sharp bend or at a rounded portion.

Irrespective of the precise embodiment, the elongate elevation and/or the additional elevation can have a flattened ridge. The ridge may comprise a plateau with a width of at most 0.1 mm, preferably of 0.03 mm to 0.06 mm. The ridge may also have irregularities in height which amount to a maximum of 5% of the height H.

Irrespective of the embodiments, the marking surface can have a marking base, in particular a planar marking base, which separates mutually opposite elongate elevations of a parallelogram from one another.

In one preferred embodiment, the marking surface is formed on one of the sidewalls of the pneumatic vehicle tire.

According to a further preferred embodiment, the marking surface is formed on the tread of the pneumatic vehicle tire. In this case, the marking surface may, in particular, also be applied to groove flanks and/or groove bases of grooves running in the tread, or at the tread outlet, that is to say at the shoulder flanks running outside the ground contact patch to the sidewalls, or on the outer surface of the tread, that is to say on treads that come into contact with the ground.

Further features, advantages and details of the invention will now be described in more detail on the basis of the drawing, which schematically shows exemplary embodiments of the invention. In the drawing:

FIGS. 4a to 4g show examples of cross sections.

Figure 1:
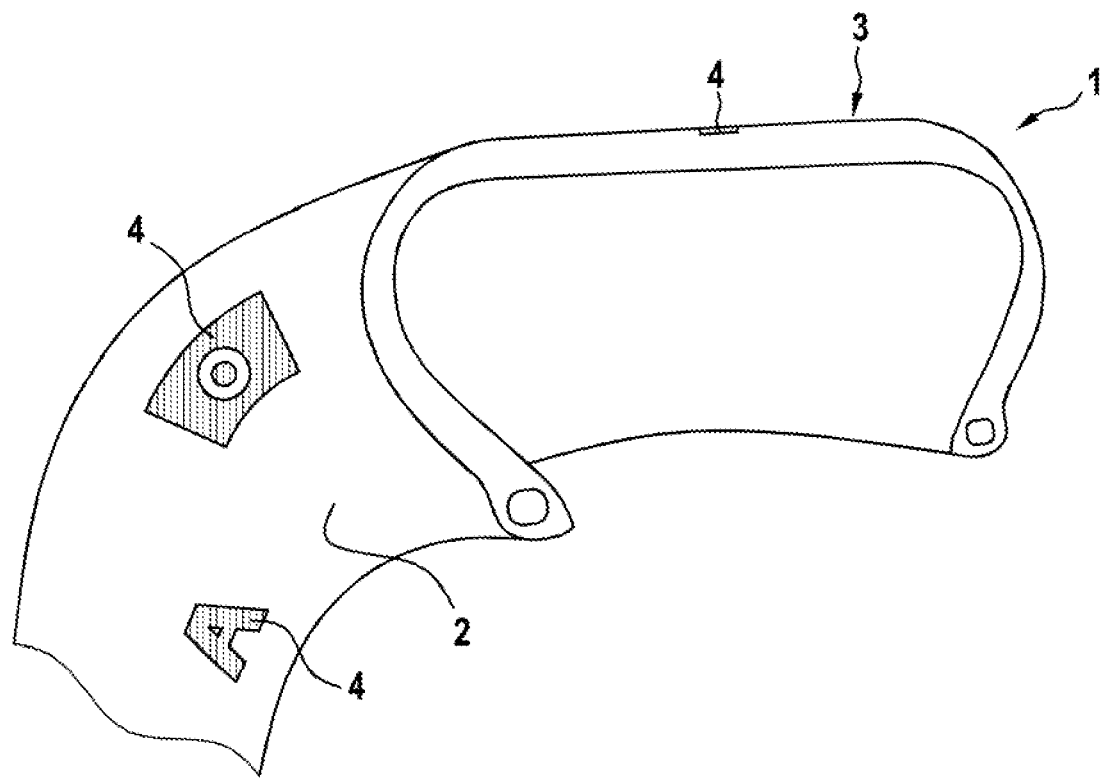
FIG. 1 shows a pneumatic vehicle tire 1 having a marking surface.

FIG. 1 shows a pneumatic vehicle tire 1 with sidewalls 2 and a tread 3 and with at least one marking surface 4 on at least one of the sidewalls 2 and/or on the tread 3. In the case of arrangement on the tread 3, the marking surface may, in particular, also be applied here to groove flanks and/or groove bases of grooves running in the tread 3, or at the tread outlet, that is to say at the shoulder flanks running outside the ground contact patch to the sidewalls, or on the outer surface of the tread, that is to say on treads that come into contact with the ground.

The marking surface 4 has two parallel sets 5, 5' comprising elongate elevations 6, 6', wherein the two parallel sets 5, 5' intersect and form a parallelogram grid. The parallelograms of the parallelogram grid have an interior angle 7 of 35° to 90°. At least one of the parallelograms, preferably at least half of the parallelograms, particularly preferably all of the parallelograms, has or have an additional elevation 8 within its or their areal extent.

Figure 2:
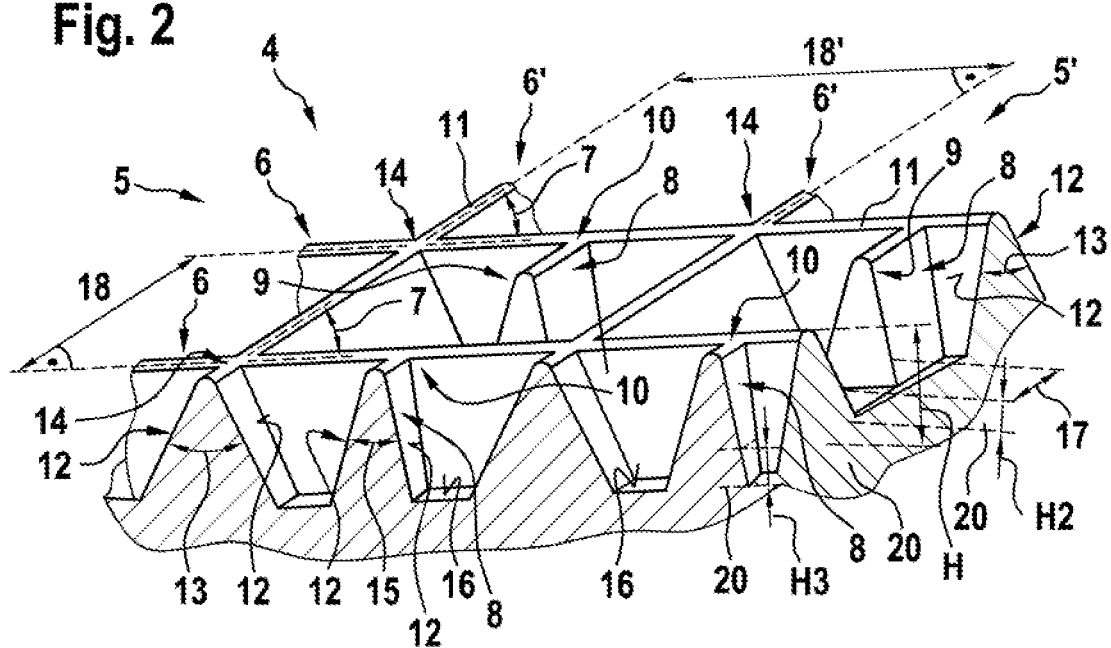
FIG. 2 shows a marking surface.

One design variant of such a marking surface 4 is shown in FIG. 2. The illustrated sectional view of the marking surface 4 is configured in such a way that the parallelograms of the parallelogram grid have an interior angle 7 of 35° to 55°, preferably of 40° to 50°, particularly preferably of 45°, and that at least one parallelogram has an additional elevation 8 within its areal extent, i.e. between the ridges 11 of the elongate elevations 6, 6' forming the parallelogram. At least half of the parallelograms preferably have such an elevation 8. In the case illustrated, all the parallelograms have such an additional elevation 8.

The additional elevation 8 of the parallelogram has an elongate extent with two end regions 9, 10. Here, precisely one end region 10 is attached to an elongate elevation 6 of the elongate elevations 6, 6' of the parallelogram, in particular at a height H3 which corresponds to at least ⅓ of the height H of the parallelogram grid.

In this exemplary embodiment, the height H of the parallelogram grid is the height averaged in accordance with the arithmetic mean over all the elongate elevations along their longitudinal extent. Heights can be measured relative to a level 20 which corresponds to a mean level of a marking base 16. The level 20 may also be the mean level of the lowest points of the parallelograms. The level 20 may also correspond to a base level that is formed, for example, by a part of the outer surface of the pneumatic vehicle tire, in particular a base of a shallow depression formed on the surface of the tire.

Here, the additional elevation 8 is aligned in its longitudinal extent largely parallel to the elongate elevations 6' of the parallel set 5'.

The additional elevation 8 has a free end region 10 which, at a height H2 which corresponds to ⅓ of the height H of the parallelogram grid, has a clear spacing 17 of 0.05 mm to 0.2 mm, preferably of 0.08 mm to 0.15 mm, with respect to the elongate elevations 6 situated opposite the free end region 19.

The parallelogram grid has a height H of 0.1 mm to 0.8 mm, preferably of 0.2 mm to 0.5 mm, particularly preferably of 0.25 mm to 0.35 mm.

The parallelogram grid illustrated is a diamond grid. Both parallel sets 5, 5' have an identical spacing 18 of 0.4 mm to 1.0 mm, preferably of 0.5 mm to 0.7 mm, particularly preferably of 0.55 mm to 0.60 mm. The spacing 18, 18' can be measured between the centers or peaks of the ridges 11 of the elongate elevations.

The elongate elevations 6, 6' may have mutually opposite flanks 12 which enclose an angle 13 of at least 50°, preferably of 55° to 65°, with one another. The angle 13 can be measured between two crossing regions 14 or between a crossing region 14 and an attached end region 10.

At least one of the elongate elevations 6, 6' and/or the additional elevation 8 of a parallelogram has mutually opposite flanks 12 which enclose an angle 15 of 2° to 10°, preferably of 6° to 8°, with one another.

The angle 15 can be measured between two crossing regions 14 or between a crossing region 14 and an attached end region 10 or between an attached end region 10 and an unattached end region 9.

In the case illustrated, the elongate elevations 6, 6' have mutually opposite flanks 12 which enclose an angle 13 of at least 50°, preferably of 55° to 65°, with one another. The additional elevations 8 furthermore have mutually opposite flanks 12 which enclose an angle of 2° to 10°, preferably of 6° to 8°, with one another. Here, the flanks 12 enclose the respective angles 13, 15 over a vertical extent which corresponds at least to one quarter of the height H of the marking region.

The elongate elevation 6, 6' and/or the additional elevation 8 may have a flattened ridge 11. The ridge may comprise a plateau with a width of at most 0.1 mm, preferably of 0.03 mm to 0.06 mm. The ridge may also have irregularities in height which amount to a maximum of 5% of the height H.

The marking surface may have a marking base 16, in particular a planar marking base 16 which separates mutually opposite elongate elevations 6, 6' of a parallelogram from one another.

The elongate elevations 6, 6' have a height H of 0.1 mm to 0.8 mm, preferably of 0.2 mm to 0.5 mm, particularly preferably of 0.25 mm to 0.35 mm. Here, the height H can be measured between crossing regions 14 and away from attached end regions 10.

The elongate elevations 6, 6' and/or the additional elevations 8 have a cross section which has a linear region in the region of at least one flank 12. As illustrated, this may merge into the marking base 16 at a sharp bend or else in a curved manner. The cross section of the elongate elevations 6, 6' and/or of the additional elevation 8 may be of symmetrical design.

Figure 3:
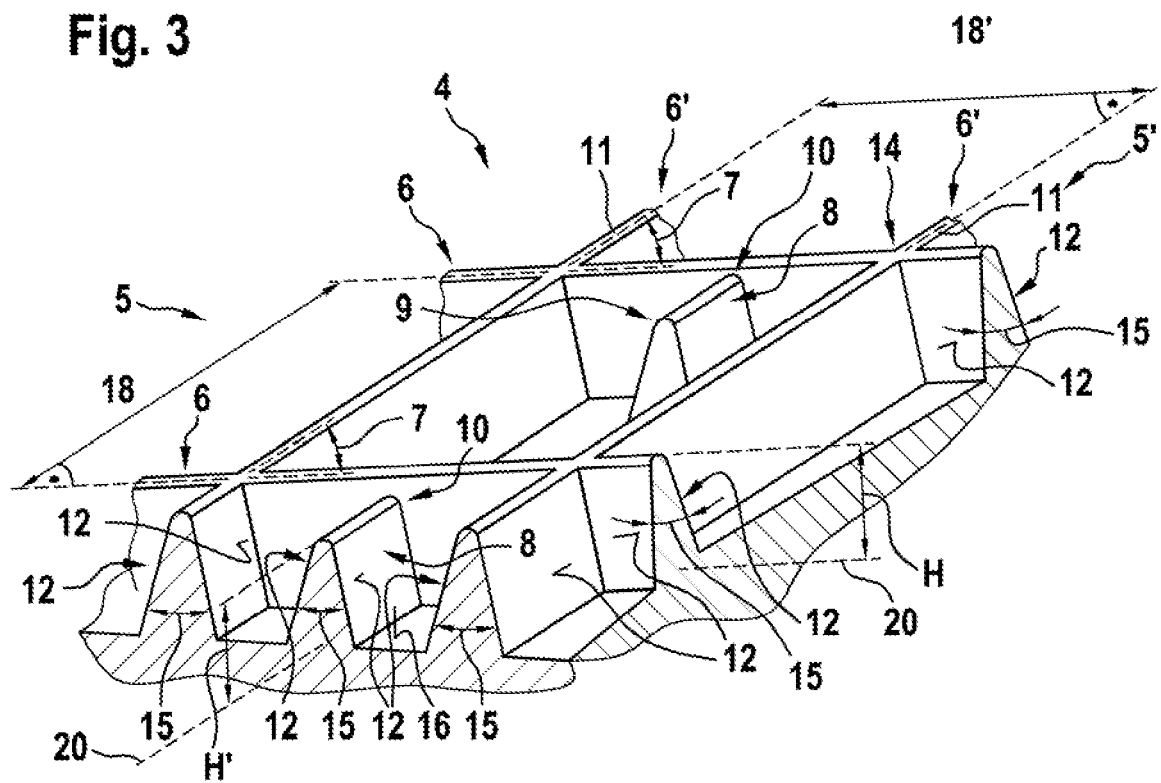
FIG. 3 shows a marking surface.

FIG. 3 shows a further marking region 4. It differs from the marking region 4 shown in FIG. 2 at least in that the two parallel sets 5, 5' differ from one another in their spacing. The spacing 18' of parallel set 5' is less than the spacing 18 of parallel set 5. Furthermore, they differ in that the elongate elevations 6, 6' also have mutually opposite flanks 12 which enclose an angle 15 of 2° to 10°, preferably of 6° to 8°, with one another. The additional elevations 8 have a lower height H' than the height H.

FIGS. 4a to 4g show examples of cross sections of the elongate elevations 6, 6' and/or of the additional elevations 8. The cross sections are suitable for the marking regions 4 illustrated in FIGS. 2 and 3. Here, the cross section runs perpendicular to the direction of longitudinal extent of the respective elongate elevation or additional elevation. The cross section of an elongate elevation 6, 6' can be measured between two crossing regions 14 or between a crossing region 14 and an attached end region 10. The cross section of an additional elevation 8 can be measured between an attached end region 10 and a free end region 9. Without limitation of generality, the cross sections are shown as being of symmetrical design.

FIG. 4a shows a cross section which has a linearly running region 19 in the region of the flanks 12 and wherein the flanks 12 enclose an angle 13 of at least 50°, preferably of 55° to 65°, with one another.

FIG. 4b shows a corresponding cross section which has a linearly running region 19 in the region of the flanks 12 and wherein the flanks 12 enclose an angle 15 of 2° to 10°, preferably of 6° to 8°, with one another.

FIG. 4c shows by way of example that, irrespective of the exact design of the cross section, the flanks 12 may also merge into the marking base 16 with a curvature.

FIG. 4d shows a cross section which has a convexly curved region 19 in the region of the flanks 12. FIG. 4e shows a cross section which has a stepped region 19 in the region of the flanks 12.

Figure 4F:
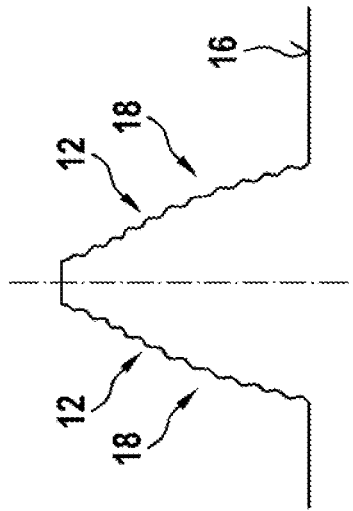
Figure 4E:
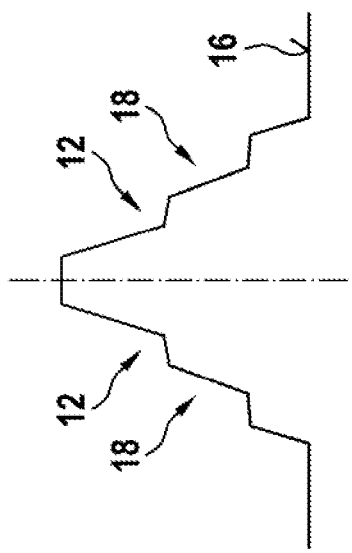
Figure 4G:
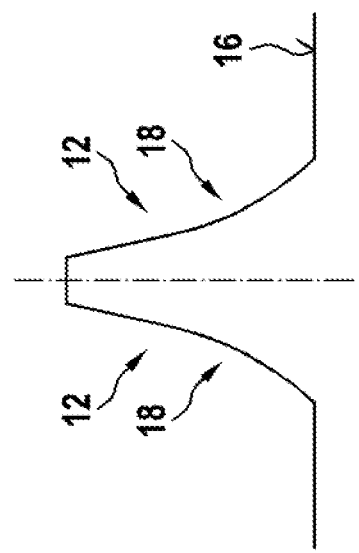

FIG. 4f shows a cross section which has a structured region 19 in the region of the flanks 12. FIG. 4g shows a cross section which has a concavely curved region 19 in the region of the flanks 12.

In all of FIGS. 4a to 4g, the correspondingly shaped region 19 may extend over at least one quarter of the height H of the parallelogram grid.

LIST OF REFERENCE SIGNS

1 Pneumatic vehicle tire
2 Sidewall
3 Tread
4 Marking surface
5, 5' Parallel set
6, 6' Elongate elevation
7 Interior angle
8 Additional elevation
9 Free end region
10 Attached end region
11 Ridge
12 Flank
13 Angle
14 Crossing region
15 Angle
16 Marking base
17 Clear spacing
18, 18' Spacing of the parallel set
19 Region
20 Level
H' Height of the additional elevation
H Height of the parallelogram grid
H3, H2 Height

The invention claimed is:

1. A pneumatic vehicle tire comprising sidewalls and a tread, and having at least one marking surface on at least one of the sidewalls and/or the tread, wherein the marking surface has two parallel sets of elongate elevations, and wherein the two parallel sets intersect and form a parallelogram grid;
wherein parallelograms of the parallelogram grid have an interior angle of 35° to 90°;
wherein a plurality of the parallelograms of the parallelogram grid have an additional elevation within their respective areal extent;
wherein the additional elevation has an elongate extent with two end regions, wherein the additional elevation is attached to one of the elongate elevations of the respective parallelogram in precisely one end region of the two end regions, the other end region of the two end regions being a free end region that is spaced apart from the elongate elevation situated opposite the free end region; and
wherein each of the plurality of parallelograms having the additional elevation has only a single additional elevation attached to only one of the elongate elevations of the parallelogram,
wherein the elongate elevations of both of the two parallel sets are arranged at a spacing of 0.4 mm to 1.0 mm, and wherein the elongate extent of the additional elevation is aligned parallel to one of the two parallel sets of elongate elevations.

2. The pneumatic vehicle tire as claimed in claim 1, wherein the interior angle is 35° to 55°.

3. The pneumatic vehicle tire as claimed in claim 1, wherein the free end region, at a height H2, corresponds to ⅓ of a height H of the parallelogram grid and has a clear spacing of 0.05 mm to 0.2 mm with respect to the elongate elevation situated opposite the free end region.

4. The pneumatic vehicle tire as claimed in claim 1, wherein the parallelogram grid has a height H of 0.1 mm to 0.8 mm.

5. The pneumatic vehicle tire as claimed in claim 1, wherein the additional elevation has a lower height H' than a height H of the parallelogram grid.

6. The pneumatic vehicle tire as claimed in claim 1, wherein the elongate elevations of both of the two parallel sets of elongate elevations are arranged at a spacing of 0.5 mm to 0.7 mm.

7. The pneumatic vehicle tire as claimed in claim 1, wherein the parallelogram grid is a diamond grid.

8. The pneumatic vehicle tire as claimed in claim 1, wherein each of the elongate elevations has mutually opposite flanks which enclose an angle of 50 to 65° relative to one another.

9. The pneumatic vehicle tire as claimed in claim 1, wherein each of the elongate elevations has mutually opposite flanks which enclose an angle of 2° to 10° relative to one another.

10. The pneumatic vehicle tire as claimed in claim 1, wherein at least one of the elongate elevations and/or the additional elevation has a cross section which, in the region of at least one flank, has a concavely curved surface.

11. The pneumatic vehicle tire as claimed in claim 1, wherein at least one of the elongate elevations and/or the additional elevation has a cross section which, in the region of at least one flank, has a stepped surface.

12. The pneumatic vehicle tire as claimed in claim 1, wherein the additional elevation of the respective parallelograms has mutually opposite flanks which enclose an angle of 2° to 10° relative to one another.

13. The pneumatic vehicle tire as claimed in claim 12, wherein at least one of the elongate elevations and/or the additional elevation has a cross section which, in the region of at least one flank, has a concavely curved surface or a stepped surface.

\* \* \* \* \*